United States Patent
Sink

[11] Patent Number: 5,871,071
[45] Date of Patent: Feb. 16, 1999

[54] ONE-WAY HIGH TORQUE CLUTCH MECHANISM

[75] Inventor: Danny R. Sink, Chester, Va.

[73] Assignee: Means Industries, Inc., Saginaw, Mich.

[21] Appl. No.: 668,144

[22] Filed: Jun. 21, 1996

[51] Int. Cl.⁶ ........................................ F16D 41/18
[52] U.S. Cl. .................... 192/46; 192/69.1; 192/108
[58] Field of Search .......................... 192/41 R, 45.1, 192/46, 69.1, 108

[56] References Cited

U.S. PATENT DOCUMENTS

| | | | |
|---|---|---|---|
| 2,240,359 | 4/1941 | Weigel | 192/45.1 |
| 2,620,619 | 12/1952 | Meyer | 192/41 R X |
| 3,623,582 | 11/1971 | Giger et al. | 192/46 |
| 3,997,041 | 12/1976 | Judd et al. | 192/41 A |
| 4,437,553 | 3/1984 | Geisthoff | 192/46 |
| 4,788,874 | 12/1988 | Nelson et al. | 74/142 |
| 5,070,978 | 12/1991 | Pires | 192/45.1 |
| 5,449,057 | 9/1995 | Frank | 192/46 |
| 5,573,094 | 11/1996 | Roberts | 192/46 X |
| 5,597,057 | 1/1997 | Ruth et al. | 192/46 |

*Primary Examiner*—Richard M. Lorence
*Attorney, Agent, or Firm*—Brooks & Kushman P.C.

[57] ABSTRACT

An improved one-way clutch assembly according to this invention includes a drive member and a driven member each having a generally planar annular surface and assembled for rotation about a common axis with the planar annular surfaces in opposed spaced relation. A coupling system is mounted between the driving and driven members and rotatably fixed for rotation with the drive member. The coupling system includes a plurality of struts or pawls supported one on one end of each of a plurality of elongated, resilient arms for movement between a retracted position within a recess in the drive member and a drive position engaging a shoulder in a pocket in the driven member.

22 Claims, 3 Drawing Sheets

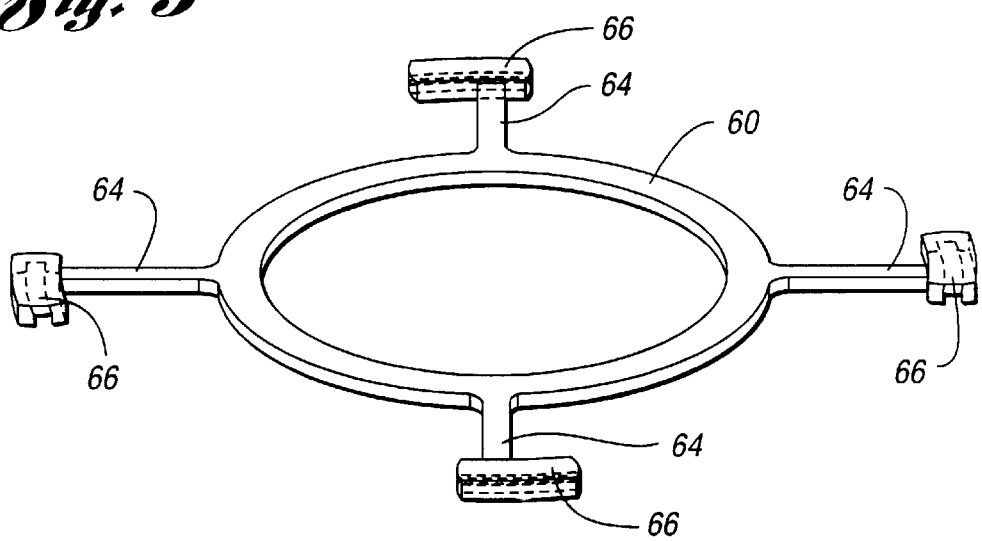
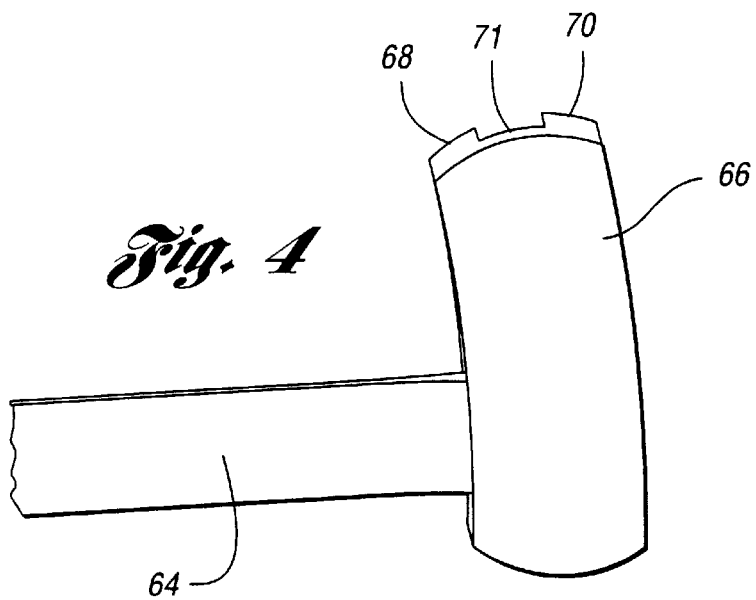
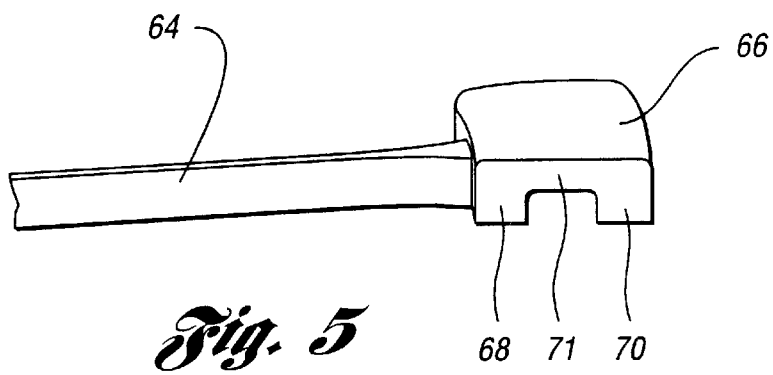

ONE-WAY HIGH TORQUE CLUTCH MECHANISM

BACKGROUND OF THE INVENTION

1. Field of the Invention

This invention relates to one-way drive mechanisms and more particularly to an improved one-way pawl and ratchet type clutch mechanism of simplified construction and high torque transmitting capability.

2. Description of the Prior Art

One-way drive mechanisms, hereinafter generally referred to as clutches, are well known and used in a wide variety of applications ranging from low speed high torque ratchet mechanisms such as those employed in hand tools or wrenches to high speed transmission devices employed in complex drive systems for automobiles, aircraft, or the like where operating speeds ranging up to 20,000 rpm or higher may be encountered.

The known one-way clutches, particularly those employed for relatively high torque transmission, generally have taken the form of a pawl and ratchet drive mechanism, a roller and ramp or ball and ramp drive mechanism, or an overrunning sprag-type drive mechanism. Examples of known clutches employing pawl and ratchet drives may be found, for example, in U.S. Pat. Nos. 5,070,978 and 5,449,057, both of which disclose disc, or face plate type pawl and ratchet clutches, and in U.S. Pat. Nos. 4,437,553 and 4,788,847 in which the pawls move in a radial direction for engagement and/or disengagement. U.S. Pat. Nos. 2,240,359 and 3,997,041 disclose known overrunning sprag clutches, and the above-mentioned U.S. Pat. No. 5,070,978 also illustrates a typical prior art roller or ball-type clutch as well as known sprag clutches and radial movement pawl and ratchet clutches.

The close tolerance required for the production of the component parts, and the number and size of these component parts, of known one-way clutches employed for high speed, high torque application generally has made these devices relatively expensive to manufacture. Also, the number and size of the component parts has made the automated assembly of the completed devices difficult, or impossible, again adding to the cost of their production. Further, the complex structure of these devices has reduced their reliability and expected service life and can result excessive maintenance cost. While the initial cost of known one-way clutches might be relatively small compared to the overall cost of a complex machine such as an automatic transmission for a vehicle, the time and expense required to remove the transmission for repair has placed a premium on their reliability which can far exceed the initial cost of the clutch per se.

The known high speed pawl and ratchet clutches have generally employed a plurality of individual pawls or struts each located in a separate pocket or recess in either the driving or driven member, and a separate resilient means, typically a spring, also located in the respective pockets continuously urges the pawl into rubbing engagement with the other of the driving or driven member. These devices typically run in a lubricating fluid which tends to dampen movement of the pawls to provide smoother operation, but loss of lubrication or prolonged running with inadequate lubrication can produce erratic operation and damage to the clutch.

The clutch disclosed in the above-mentioned U.S. Pat. No. 5,070,978 attempts to overcome the problems encountered by the free floating pawls by mounting the pawls on a free floating or journaled carrier disc for movement between a driving position engaging recesses in both the driving and driven clutch plates and an overrunning position. Again, a plurality of pawls are required with pivot means mounting the respective pawls for limited movement relative to the carrier disc, and a separate spring member is required for each pawl.

A one-way clutch device suitable for use in low speed, low torque applications such as the automatic winding mechanism of a wrist watch is illustrated in U.S. Pat. No. 3,623,582. This clutch employs a drive disc mounted for free rotation on an arbor in opposed spaced relation to a driven disc fixedly mounted on the arbor. A wedging member journaled for free rotation on the arbor between the driving and driven plates has a plurality of radially extending arms each carrying an elongated arcuate wedging blade integrally formed on its end. The wedging blades have their opposed ends deflected in opposite directions axially of the arbor so as to rub one against each of the opposing faces of the driving and driven members and to be deflected thereby sufficiently to apply a twist or torque to the supporting radial arm. Each of the relatively rotating faces is provided with a plurality of circumferentially spaced driving recesses or openings into which the free ends of the projecting blades can deflect so that when the driving disc is rotated in one direction, the ends of the wedging blades will be deflected into the openings in the associated discs to interlock the two discs for simultaneous rotation. Conversely, upon relative rotation in the opposite direction, the wedging blades and supporting structure will float free, with the free ends of the wedging blades sliding over the driving openings. This arrangement inherently results in the possibility of substantial "dead motion", or relative rotation between the driving and driven members before the driving disc is locked to and commences to drive the driven disc. Since both ends of the wedging blades have to engage in an opening, the number of engagements is, in effect, doubled thereby inhibiting smooth operation of the device. Further, the offset or bent configuration of the wedging blades inherently results in substantial bending stress applied thereto, and the substantial length and curvature of the wedging blades greatly reduces their column strength so that the device is not well suited either for high speed operation or for the transfer of heavy torque loads.

It is accordingly a principal object of the present invention to provide an improved one-way clutch mechanism which has a minimum number of component parts and which overcomes the drawbacks of the known one-way clutches.

Another primary object of the present invention is to provide an improved one-way clutch suitable for the smooth reliable transfer of high torque loads and high speed operation.

It is another object of the invention to provide such a one-way clutch which is economical to manufacture and which is substantially maintenance free in operation.

It is another object of the present invention to provide such a one-way clutch in which the driving pawls or struts are rotatably fixed relation to and continuously urged into engagement with recesses in one of the driving or driven members whereby the free floating action is avoided.

SUMMARY OF THE INVENTION

The foregoing and other objects and advantages are achieved in a one-way clutch according to the present invention which includes a drive disc, a driven disc and a coupling means for coupling the drive member to the driven member for rotation therewith in one direction about a common axis while permitting free relative rotation of the drive disc in the other direction. The drive and driven members each preferably have substantially planar faces supported in fixed, opposing, parallel relation with the coupling means disposed therebetween and fixed for rotation with one of the drive or driven members. Although the coupling means may be fixed for rotation with either the drive or driven member, for convenience of description herein, the coupling element is illustrated and will be described as being rotatably fixed with respect to the drive member, it being understood that the description would apply equally to the arrangement in which the coupling means is rotatably fixed to the driven member.

In the preferred embodiment of the invention, the driving member has a number of pockets formed in its drive face, with each pocket receiving a pawl or strut integrally formed with or rigidly attached to a supporting arm rotatably fixed with respect to the driving member and continuously urging the respective pawls into engagement with a driving shoulder in its associated recess. The supporting arm also acts as a biasing means continuously urging the other end of its associated pawl or strut in an axial direction away from the drive face for engagement with one of a plurality of ratchet teeth formed in an annular ring on the face of the driven member. The strut support arms may be in the form of generally radially extending arms projecting from a central annular ring supported for coaxial rotation with the drive member, with the arms being captured, as by grooves or other restraining means, on the radial face of the drive member between the annular ring and the strut. The supporting arms can be shaped so as to normally support the respective struts in planes inclined with respect to the planes of the drive and driven faces whereby the struts are deflected and a torsion stress is applied to each supporting arm to continuously urge the strut into the pocket in the drive face and into engagement with the drive shoulder at one end of the strut, and to continuously urge the other end of the strut toward the driven face for engagement with the ratchet teeth.

Either the drive or driven member may be provided with retaining means for retaining the drive and driven members in fixed axially spaced relation, and the support ring for the arms may be captured between the drive and driven members to retain the ring in fixed axially spaced relation on the assembly.

The individual pawls or struts are relatively short elements having high column strength capable of transferring substantial loads between the driving and driven member without distortion. In one embodiment of the invention, the coupling means may be a single element integrally formed from a suitable metallic material such as a high strength steel sheet material, with the integrally formed struts being shaped, as by a drawing or stamping operation, to provide increased strength and dimensional stability or rigidity, and with the entire assembly being heat treated, if necessary, to provide the desired hardness and wear characteristics and to maintain the desired torsion load in the strut support arms when the clutch is assembled.

Other features and advantages of the invention will be apparent from the detailed description contained hereinbelow, taken in conjunction with the drawings, in which:

FIG. 3 is an isometric view of a component part of the clutch assembly of FIG. 1;

FIG. 4 is an enlarged plan view of a portion of the structure shown in FIG. 3;

FIG. 5 is an elevation view of the structure shown in FIG. 4;

DESCRIPTION OF THE PREFERRED EMBODIMENT

Figure 1:
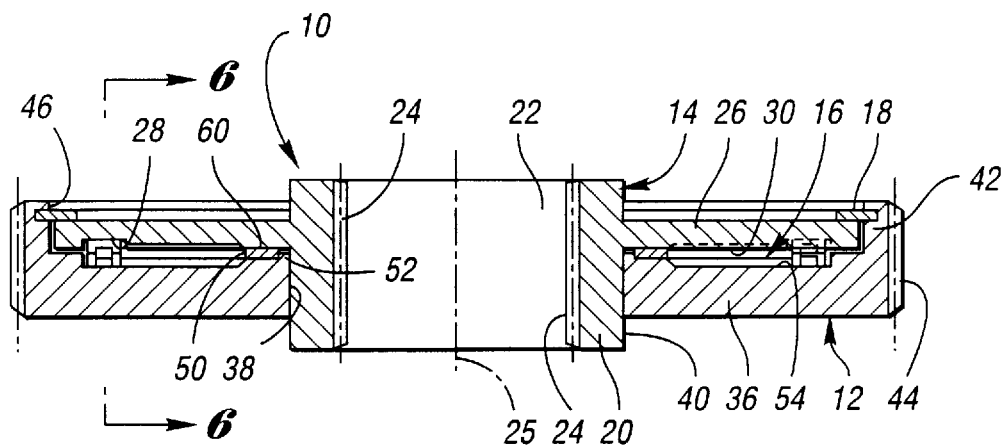
FIG. 1 is a diagrammatical sectional view of a one-way clutch assembly embodying the invention.
Figure 6:
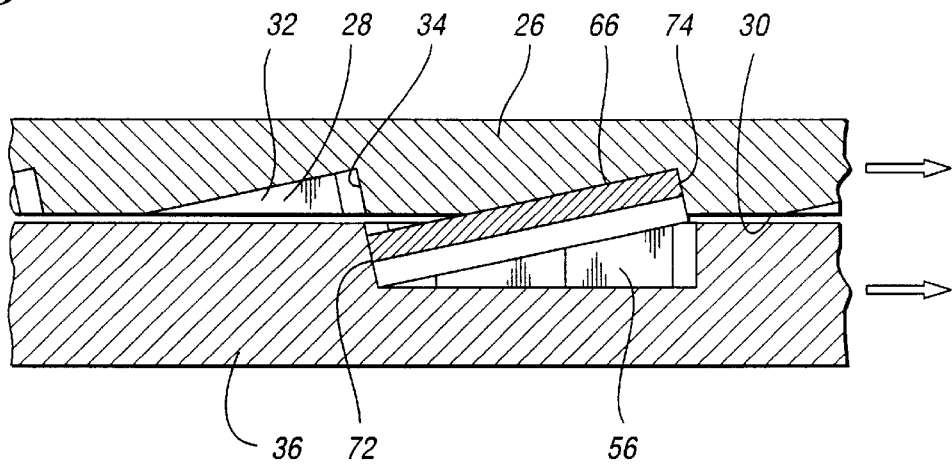
FIG. 6 is an enlarged fragmentary sectional view taken on line 6—6 of FIG. 1.
Figure 7:
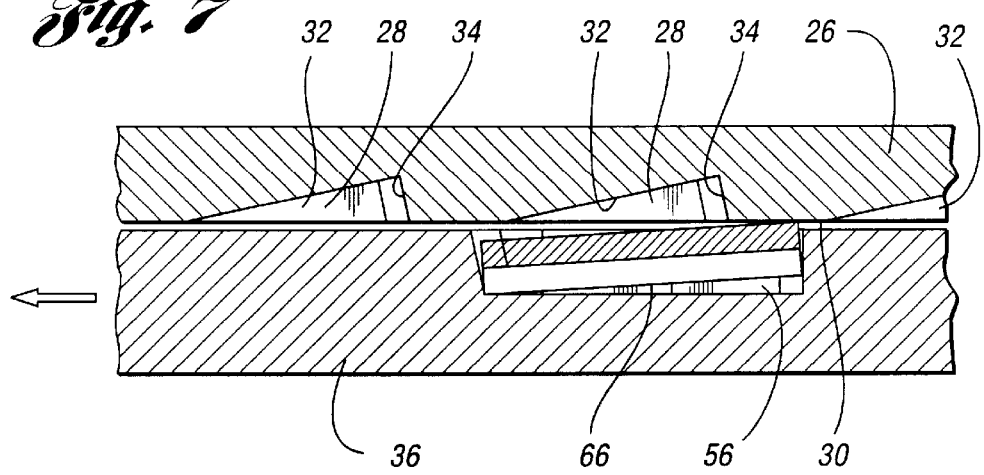
FIG. 7 is a view similar to FIG. 6 showing the elements thereof in an alternate position.

Referring now to the drawing in detail, a one-way overrunning clutch according to the present invention is shown, in section, in FIG. 1 and indicated generally by the reference numeral 10. In this preferred embodiment, the clutch assembly comprises only four component parts including a drive member 12, a driven member 14, a coupling member 16, and a retaining ring 18 for retaining the clutch in assembled relation as explained hereinbelow. The driven member 12 comprises a central hub 20 having an axial bore 22 extending therethrough, with splines indicated schematically at 24 formed around its inner periphery for fixing the driven member on a shaft, not shown, for rotation about an axis indicated at 25. A substantially flat, radially extending annular flange 26 is integrally formed on hub 20, and a plurality of recesses or pockets 28 are formed in an annular ring on one generally planar face 30 of flange 26. As best seen in FIGS. 6 and 7, each pocket is defined by a generally planar surface 32 inclined at a relatively small angle with respect to face 30 and a shoulder portion 34 disposed at a relatively high angle with respect to face 30. The shoulder 34 may be a generally flat, planar surface, but preferably is slightly curved, or arcuate. Pockets 28 are equally spaced around a circular path on the face 30.

Figure 2:
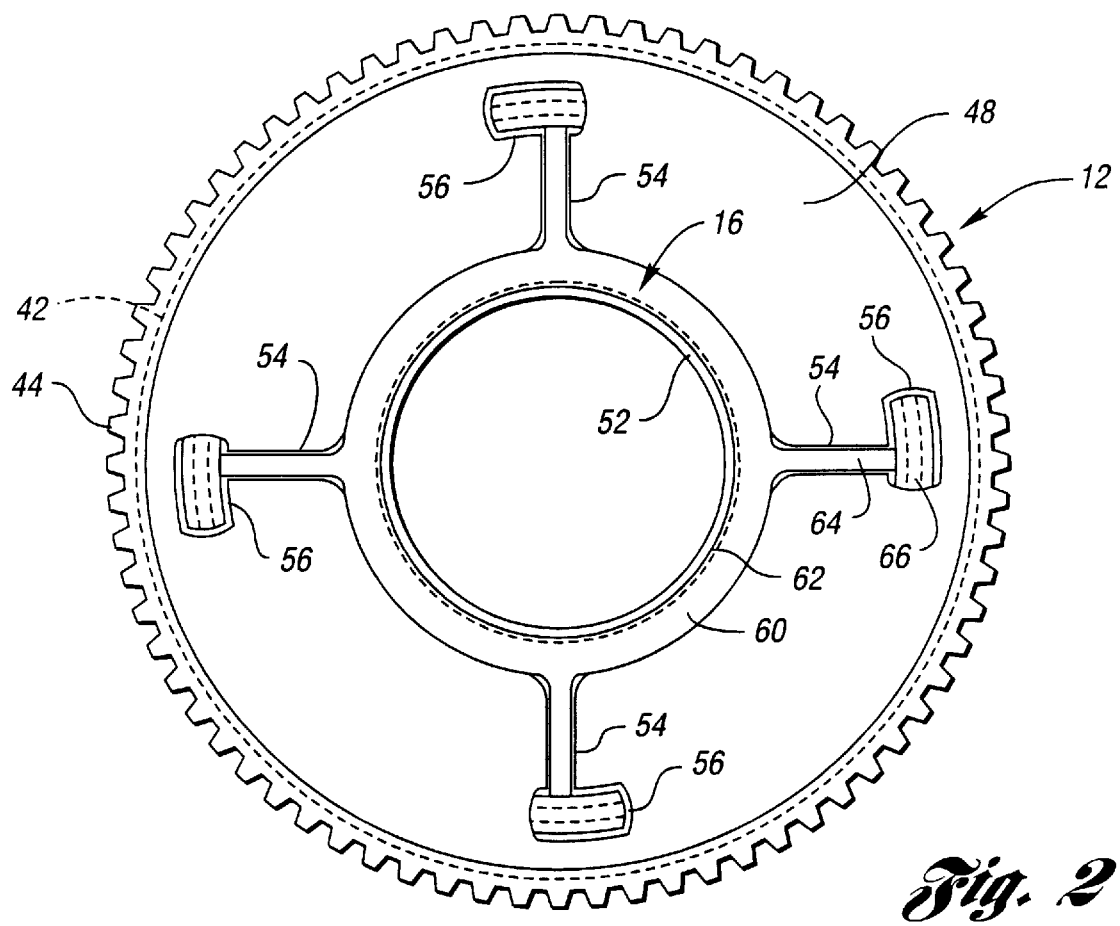
FIG. 2 is a plan view of a portion of the clutch assembly shown in FIG. 1, with other portions omitted.

As best seen in FIGS. 1 and 2, the drive member 12 includes a generally disc-shaped body portion 36 having an inner cylindrical peripheral surface 38 adapted to fit closely upon and be freely rotatable around the outer cylindrical surface 40 of hub 20. Body 36 terminates at its outer periphery in an axially extending rim portion 42 having gear teeth, indicated at 44, formed thereon for engagement with a suitable input gear, not shown, for driving the drive member around the axis 25 on hub surface 40. A retaining ring groove 46 is formed in the inner or overhang portion of the rim 42 for receiving the retaining ring 18 to retain drive member 12 and driven member 14 in assembled relation.

Still referring to FIGS. 1 and 2, the face, or surface 48 of drive member 12, which in the assembled clutch is directed toward the driven surface 30 is provided with a patterned recess for receiving the coupling member 16. This patterned recess includes an annular central ring portion 50 spaced radially outward slightly from the inner surface 38, to provide a positioning shoulder 52. A plurality of radially extending, substantially identical, circumferentially spaced arm-like grooves 54 communicate with and project radially outward from the ring groove portion 50, with each radial groove portion 54 terminating at its radially outer end in an enlarged circumferentially extending pocket or groove portion 56. The groove portions 54 and 56 extend into the body 36 to an axial depth greater than the ring portion 50 for reasons pointed out more fully hereinbelow.

The coupling member 16 is a spider-like structure including an annular central ring 60 having an inner periphery 62 dimensioned to fit over and be radially fixed by the shoulder 52 and a plurality of radially extending legs 64 spaced circumferentially around the ring 60 in position to fit one into each of the arm like grooves 54. Each leg 64 has integrally formed or rigidly fixed on its outer end a rigid strut, or pawl 66, dimensioned to fit within the recessed end portions 56 of the patterned groove in face 48. It is pointed out that in FIG. 2, the driven member 14 and retaining ring 18 are omitted to more clearly illustrate the recessed, interfitting relation between the recessed groove of the drive member and the connecting member 16.

As can be seen from FIGS. 3, 4 and 5, coupling member 16 may be formed, as by a die cutting and stamping operation, from a single sheet of metal, for example a high strength relatively hard steel, with the struts or pawl portions 66 each being offset along its radially inner and outer elongated edges to provide a channel shaped beam having thickened edge portions 68, 70 joined by web portion 71 to provide increased column strength in a direction generally circumferentially of the clutch device. The ends of the respective struts 66 have substantially arcuate inner and outer side edges, each having a radius of curvature corresponding to the distance from the central axis 25, and each strut preferably has a generally arcuate or curved end. The struts 66 are offset circumferentially to extend from their respective supporting arm portions 64 a distance greater in one direction than the other, with this greater distance being in the direction of rotation of the drive member 12 for driving engagement with the drive pockets 28 or ratchet teeth in the driven member. Also, the enlarged end portions 56 are correspondingly arcuate in shape as are the end shoulders 34 of pockets 28. This arcuate shape of the ends of the struts 66 and of the end or shoulder surface 34 of pockets 28 cooperates to minimize stress concentrations which could result from any slight misalignment of the parts under heavy load.

As best seen in FIGS. 4 and 5, the legs 64 are each deformed by twisting the outer end portion to provide a permanent set tending to retain the individual struts 66 at an incline with respect to the plane of the surface 48, with the leading or driving end 72 projecting outwardly from the surface 48 toward the pockets 28 and the trailing or driven end 74 being continuously urged into engagement with the bottom of the enlarged end portion 56 of the groove formed in surface 48 and in engagement with the adjacent end of that groove. This permanent twist in arm 64 is sufficient to provide the resilient force required to continuously urge the struts 66 toward engagement with a pocket 28 so that when drive member 14 is rotated in one direction, the leading end 72 will engage the shoulder 34 to positively drive the driven member 14 for rotation therewith. Conversely, when the drive member is rotated in the opposite direction, or when the driven member tends overrun the drive member, the flat surface of the web portion 71 of the struts will engage the inclined surface 32 of pockets 28 to deflect the struts into the enlarged end portion 56 of the patterned groove to permit overrunning of the driven member, or rotation of the drive member without directly applying a driving force to the driven member.

Legs 64 are also slightly offset axially from the central ring portion 60 into the increased depth portion of the arm-like groove portions 54 so as to lie closely to the bottom of the groove portions 54 when the clutch is in the overrunning condition in which the struts 66 are depressed into the enlarged groove portions 56. It will be apparent, however, that when the struts 66 are in the driving position, or in engagement with the shoulder surface 34 of pockets 28 the radially outer ends of the arms will be lifted slightly from this position, but the length and increased thickness of the pawls prevent any contact of the legs 64 with the surface 30 of the driven member.

Figure 8:
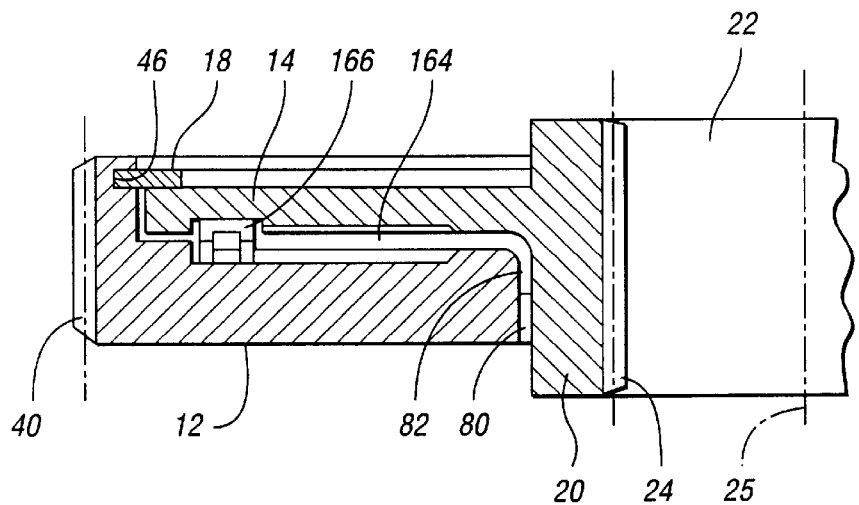
FIG. 8 is a fragmentary sectional view showing an alternate embodiment of the invention.

FIG. 8 illustrates a modification of the invention in which the coupling means is in the form of a plurality of individual leg members corresponding generally to the legs 54, with the struts 56 attached thereon as in the embodiment described above. In this modified embodiment, the drive member 12 is formed with a plurality of keyway-like slots 80 extending axially of its inner surface around the inner periphery thereof, with the strut support arms 164 having an L-shaped bend 82 on its inner end dimensioned to fit snugly, preferably with a slight interference fit, into the key slot 80 to accurately locate the arms, and thereby the integrally formed struts supported on the end thereof. The individual struts are thus rotatably fixed with respect to the drive member and function in the same manner as described above with respect to the embodiment in which the plurality of strut support legs are carried on a central annular ring.

As is well known in the art, the number of drive pockets in the driven member, in combination with the number and relative spacing of the struts 66 will influence the maximum relative rotation between the drive and driven members to engage the struts and drive pockets. Also, the number and spacing of the drive struts can be arranged to permit a single strut to engage and drive the driven member, or two or more struts can simultaneously engage in separate drive pockets. In a preferred embodiment, two substantially diametrically opposed struts will simultaneously engage a drive pocket and in this instance, if four sets of pawls are employed, the spacing will be such that relative travel between the drive and driven members will be maximum of ½ the pitch of the drive pockets in order to assure engagement. This ratio can, of course, be varied in accordance with known techniques.

It is pointed out that, while members 12 and 14 are referred to as the drive members and driven members, respectively, the clutch assembly will work in the same manner, but in the opposite direction, regardless of whether the power input is through the splines 24 or the gear teeth 40.

It is also believed apparent that various means other than the retaining ring 18 illustrated in the drawings may be employed to retain the drive member and driven member in assembled relationship.

In the embodiment of the invention illustrated in FIGS. 1–7, the drive and driven member may be formed by a milling and/or machining operation or by various other techniques. For example, it is contemplated that powdered metallurgy techniques may be employed to mold the drive and driven members. Similarly, both the drive and driven member may be formed from a flat metal stock by a die forming and/or drawing operation. When formed of sheet metal, staked or punched stops or guides can be formed to perform the function of the grooves for retaining the coupling member in accurately positioned, rotatably fixed relation on the drive member. In such a modification, an integral, axially extending flange could be formed on the drive member, with the flange being formed in a pressing operation into overlying relation to retain the drive member, driven member, and connecting member(s) in assembled relationship.

It is also pointed out that, while the coupling member may be formed from a single piece of metal, the various components including the central support ring (if used), the support arms and/or the struts may be separately formed and rigidly joined as by a staking, spot welding, or other operation.

It is apparent that the one-way overrunning clutch assembly of the present invention lends itself readily to automated assembly, utilizing a minimum number of simple, inexpensive component parts.

While preferred embodiments of the invention have been described, it is believed apparent that various modifications might be made and it is to be understood that the invention is not limited to the disclosed embodiments, but rather that it is intended to include all embodiments thereof which would be apparent to one skilled in the art and which come within the spirit and scope of the invention.

What is claimed:

1. A one-way clutch assembly comprising
   a drive member having an annular, generally planar surface having a plurality of recesses formed therein, said recesses each providing a strut engaging drive shoulder
   a driven member having an annular, generally planar surface having a plurality of pockets formed therein, said pockets each providing a strut engaging shoulder,
   retaining means retaining said drive member and said driven member in assembled relation for rotation about a common axis with said generally planar surfaces in parallel, opposed, closely spaced relation,
   coupling means rotatably fixed on said drive member for rotation therewith about said common axis, said coupling means including a plurality of elongated resilient support arms and a plurality of rigid struts fixed on one end of each said elongated resilient support arm, and arm connecting means joining the other end of each said elongated resilient support arm to said drive member for rotation therewith, said arm connecting means being spaced from said recesses,
   said struts each having one end positioned in one of said recesses and in continuous engagement with said strut engaging drive shoulder,
   each said elongated resilient support arm being biased to continuously urge the other end of the strut mounted thereon toward said generally planar surface of said driven member for engagement with said strut engaging shoulder in one of said pockets whereby, upon rotation of the drive member in one direction, the struts engaging the shoulders in said pockets will drive the driven member for rotation about said common axis with said drive member, and said elongated resilient support arm will be deflected to permit disengagement of the struts from the strut engaging shoulder of said pockets upon rotation of the driven member in the opposite direction relative to the driven member.

2. The clutch assembly defined in claim 1 wherein said coupling means comprises a plurality of generally radially extending resilient arm members spaced from one another around said generally planar surface of said drive member, said elongated resilient support arms being supported at their radially inner end portions for rotation with said drive member.

3. The clutch assembly defined in claim 2 wherein each said struts and the elongated resilient support arm connected thereto are integrally formed from a single piece of metal.

4. The clutch assembly defined in claim 1 wherein said coupling means comprises an annular ring supported for rotation with said drive member and a plurality of generally radially extending resilient support arms each having one end joined with said ring and its other end supporting one of said struts.

5. The clutch assembly defined in claim 4 wherein said annular ring, said plurality of elongated resilient support arms and said struts are integrally formed from a single piece of metal.

6. The clutch assembly defined in claim 5 wherein each strut is formed to have a generally channel shaped cross section to thereby provide an increase in its rigidity and column strength.

7. The clutch assembly defined in claim 6 wherein said drive member comprises a patterned groove formed in said generally planar surface thereof for receiving said elongated resilient support arms and defining said recesses.

8. The clutch assembly defined in claim 1 wherein one of said drive member or said driven member comprises an axially extending hub adapted to be mounted on a shaft for rotation therewith, said hub having an outer cylindrical surface, and wherein said other of said drive member or driven member is mounted for rotation on said outer cylindrical surface.

9. The clutch assembly defined in claim 8 wherein the other of said drive member or said driven member comprises an axially extending rim portion around its outer periphery, said rim portion extending over and surrounding the outer periphery of said one of said drive member or driven member, an inwardly directed groove formed in an annular surface of said axially extending rim portion, said retaining means comprising a retaining ring received within said inwardly directed groove.

10. The clutch assembly defined in claim 8 wherein said coupling means comprises a plurality of generally radially extending resilient support arms spaced from one another around said generally planar surface of said drive member, said resilient support arms being supported at their radially inner end portions for rotation with said drive member.

11. The clutch assembly defined in claim 8 wherein said coupling means comprises an annular ring supported for rotation with said drive member and a plurality of generally radially extending resilient support arms each having one end joined with said ring and its other end supporting one of said struts.

12. The clutch assembly defined in claim 9 wherein said coupling means comprises a plurality of elongated generally radially extending resilient support arm members spaced from one another around said generally planar surface of said drive member, said resilient arms being supported at their radially inner end portions for rotation with said drive member.

13. The clutch assembly defined in claim 9 wherein said coupling means comprises an annular ring supported for rotation with said drive member and a plurality of generally radially extending support arms each having one end joined with said ring and its other end supporting one of said struts.

14. The clutch assembly defined in claim 13 wherein said annular ring, said plurality of elongated resilient support arms and said struts are integrally formed from a single piece of metal.

15. The clutch assembly defined in claim 14 wherein each strut is formed to have a generally channel shaped cross section to thereby provide an increase in its rigidity and column strength.

16. A one-way clutch assembly comprising
    a drive member having an annular, generally planar surface having at least one recess,
    a driven member having an annular, generally planar surface having at least one pocket, said drive member and said driven member being assembled in relation for rotation about a common axis with said generally planar surfaces in substantially parallel and opposed relation,
    at least one coupling member having a resilient support arm and a strut fixed on one end of said resilient support arm, the other end of said resilient support arm being connected to said drive member, said strut having one end positioned in said recess, said resilient support arm continuously biasing the other end of said strut toward said generally planar surface of said driven member for engagement with the at least one pocket whereby, upon rotation of the drive member in one direction, the strut engaging the at least one pocket will drive the driven member for rotation about said common axis with said drive member, and such that said resilient support arm will deflect to permit disengagement of the strut from the at least one pocket upon rotation of the drive member in the opposite direction relative to the driven member, wherein the resilient support arm and strut are integrally formed from a single piece of material.

17. The one-way clutch defined in claim 16 wherein said resilient support arm is connected to said drive member at a distance spaced from the at least one recess.

18. The clutch assembly defined in claim 17 wherein said drive member includes a patterned groove formed in said generally planar surface thereof for receiving said resilient support arm and defining the at least one recess.

19. A one-way clutch assembly comprising a drive member having an annular, generally planar surface having at least one recess, a driven member having an annular, generally planar surface having at least one pocket, said drive member and said driven member being assembled in relation for rotation about a common axis with said generally planar surfaces in substantially parallel and opposed relation, at least one coupling member having a resilient support arm and a strut fixed on one end of said resilient support arm, the other end of said resilient support arm being connected to said drive member, said strut having one end positioned in said recess, said resilient support arm continuously biasing the other end of said strut toward said generally planar surface of said driven member for engagement with the at least one pocket whereby, upon rotation of the drive member in one direction, the strut engaging the at least one pocket will drive the driven member for rotation about said common axis with said drive member, and such that said resilient support arm will deflect to permit disengagement of the strut from the at least one pocket upon rotation of the drive member in the opposite direction relative to the driven member, wherein said strut is fixed to one end of said resilient support arm and an arm connecting member joins the other end of said resilient support arm to said drive member at a distance spaced from the at least one recess.

20. A one-way clutch assembly comprising, a drive member having an annular, generally planar surface defining a patterned groove, said patterned groove defining at least one recess, the at least one recess providing a strut engaging drive shoulder, driven member having an annular, generally planar surface having at least one pocket, the pocket providing a strut engaging driven shoulder, said drive member and said driven member being assembled in relation for rotation about a common axis with said generally planar surfaces in substantially parallel and opposed relation, at least one coupling member having a resilient support arm and a strut fixed on one end of said resilient support arm, said resilient support arm and said strut being integrally formed from a single piece of material, an arm connecting member joining the other end of said resilient support arm to said drive member at a distance spaced from the at least one recess, said resilient support arm and strut being positioned within said patterned groove such that said strut has one end positioned in said recess so as to be in an engaging relation with said strut engaging drive shoulder, said resilient support arm continuously biasing the other end of the strut toward said generally planar surface of said driven member for engagement of said strut engaging driven shoulder whereby, upon rotation of the drive member in one direction, the strut engaging driven shoulder will drive the driven member for rotation about said common axis with said drive member, and such that said resilient support arm will deflect to permit disengagement of the strut from the at least one pocket upon rotation of the drive member in the opposite direction relative to the driven member.

21. A one-way clutch assembly comprising a drive member having an annular, generally planar surface having at least one recess, a driven member having an annular, generally planar surface having at least one pocket, said drive member and said driven member being assembled in relation for rotation about a common axis with said generally planar surfaces in substantially parallel and opposed relation, at least one coupling member having a resilient support arm and a strut rigidly attached to one end of said resilient support arm, the other end of said resilient support arm being connected to said drive member, said strut having one end positioned in said recess, said resilient support arm continuously biasing the other end of said strut toward said generally planar surface of said driven member for engagement with the at least one pocket whereby, upon rotation of the drive member in one direction, the strut engaging the at least one pocket will drive the driven member for rotation about said common axis with said drive member, and such that said resilient support arm will deflect to permit disengagement of the strut from the at least one pocket upon rotation of the drive member in the opposite direction relative to the driven member.

22. The clutch assembly defined in claim 21, wherein said resilient support arm continuously biases the one end of said strut toward a shoulder formed in said recess.

* * * * *

UNITED STATES PATENT AND TRADEMARK OFFICE
CERTIFICATE OF CORRECTION

PATENT NO. : 5,871,071

DATED : February 16, 1999

INVENTOR(S) : DANNY R. SINK

It is certified that error appears in the above-identified patent and that said Letters Patent is hereby corrected as shown below:

On the face of the patent: item [22], should read--

"Filed: June 8, 1998.

Related U.S. Application Data

Continuation of Ser. No. 668,144, June 21, 1996." --.

Signed and Sealed this

Twenty-eighth Day of September, 1999

Attest:

Q. TODD DICKINSON

*Attesting Officer*   Acting Commissioner of Patents and Trademarks